United States Patent [19]
Okada et al.

[11] Patent Number: 5,978,156
[45] Date of Patent: Nov. 2, 1999

[54] LENS BARREL AND OPTICAL APPARATUS

[75] Inventors: Tadanori Okada, Yokohama; Masanori Ishikawa, Tokyo, both of Japan

[73] Assignee: Canon Kabushiki Kaisha, Tokyo, Japan

[21] Appl. No.: 08/896,366

[22] Filed: Jul. 18, 1997

[30] Foreign Application Priority Data

Jul. 23, 1996 [JP] Japan .................................... 8-193648

[51] Int. Cl.$^6$ ................................................. G02B 15/14
[52] U.S. Cl. .......................................... 359/699; 359/701
[58] Field of Search ..................................... 359/696, 697, 359/698, 699, 695, 700, 701; 396/142

[56] References Cited

U.S. PATENT DOCUMENTS

| | | | |
|---|---|---|---|
| 4,830,475 | 5/1989 | Ishiyama et al. | 359/701 |
| 5,144,490 | 9/1992 | Yamanouchi | 359/694 |
| 5,373,397 | 12/1994 | Satoh et al. | 359/699 |
| 5,715,482 | 2/1998 | Wakabayahsi et al. | 396/79 |
| 5,751,500 | 5/1998 | Bedzyk | 359/740 |

FOREIGN PATENT DOCUMENTS

| | | |
|---|---|---|
| 1154014 | 6/1989 | Japan . |
| 5142475 | 6/1989 | Japan . |
| 3144411 | 6/1991 | Japan . |
| 6175023 | 6/1994 | Japan . |
| 6180423 | 6/1994 | Japan . |
| 814651 | 8/1996 | Japan . |

Primary Examiner—Georgia Epps
Assistant Examiner—Ricky Mack
Attorney, Agent, or Firm—Robin, Blecker & Daley

[57] ABSTRACT

A lens barrel includes a plurality of lens units, a plurality of cams arranged to respectively cause the plurality of lens units which are being rotated around an optical axis during a focusing action to move in the optical axis direction, at least one of the plurality of cams being a range varying cam which causes a moving range of the associated lens unit to vary according to a magnification varying state, and a rotary driving member arranged to be rotated around the optical axis by a manual operation or by a motor, wherein the plurality of lens units are interlinked with the rotary driving member in such a way as to be movable in the optical axis direction relative to the rotary driving member independently of each other and rotatable integrally with the rotary driving member.

22 Claims, 12 Drawing Sheets

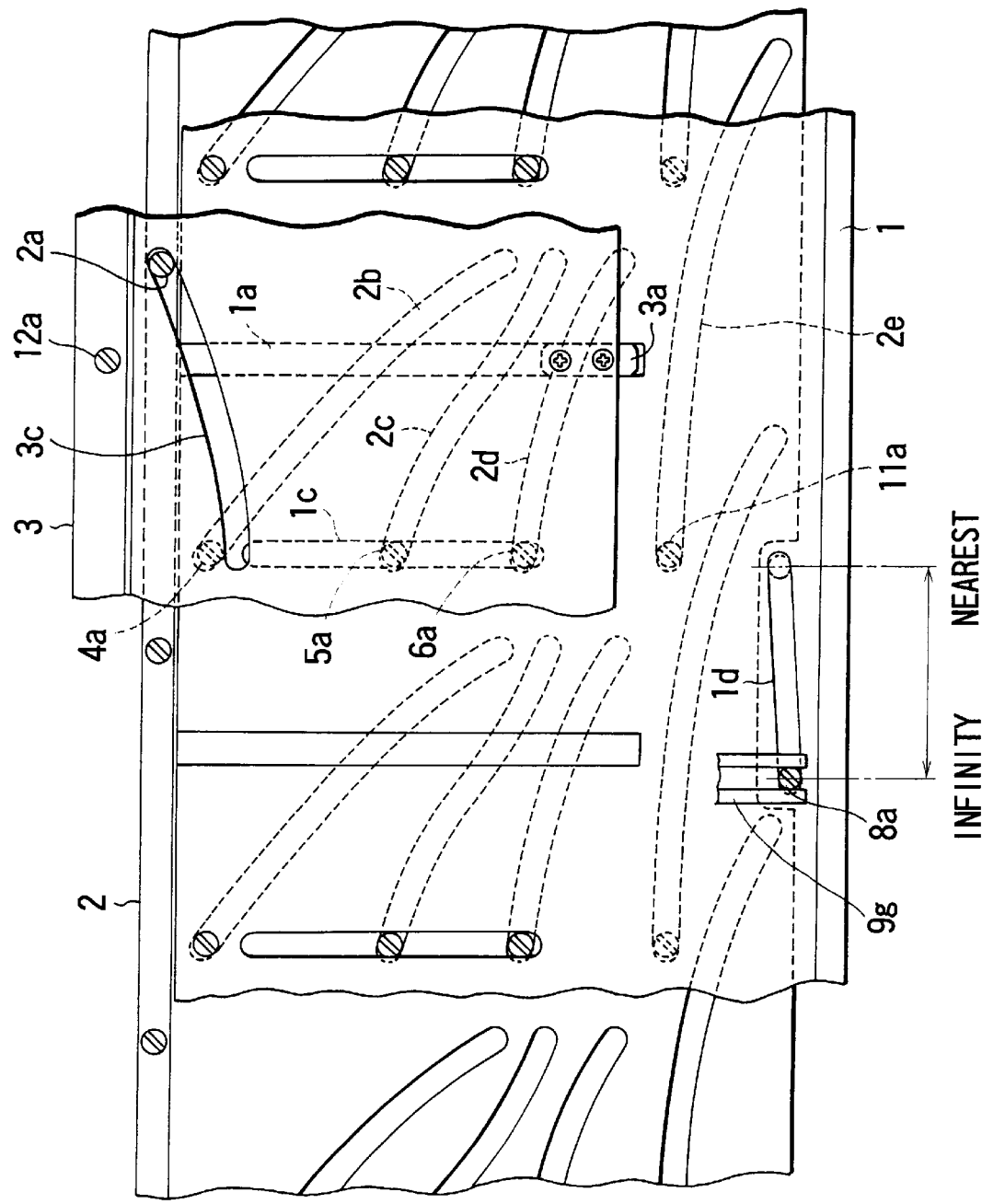

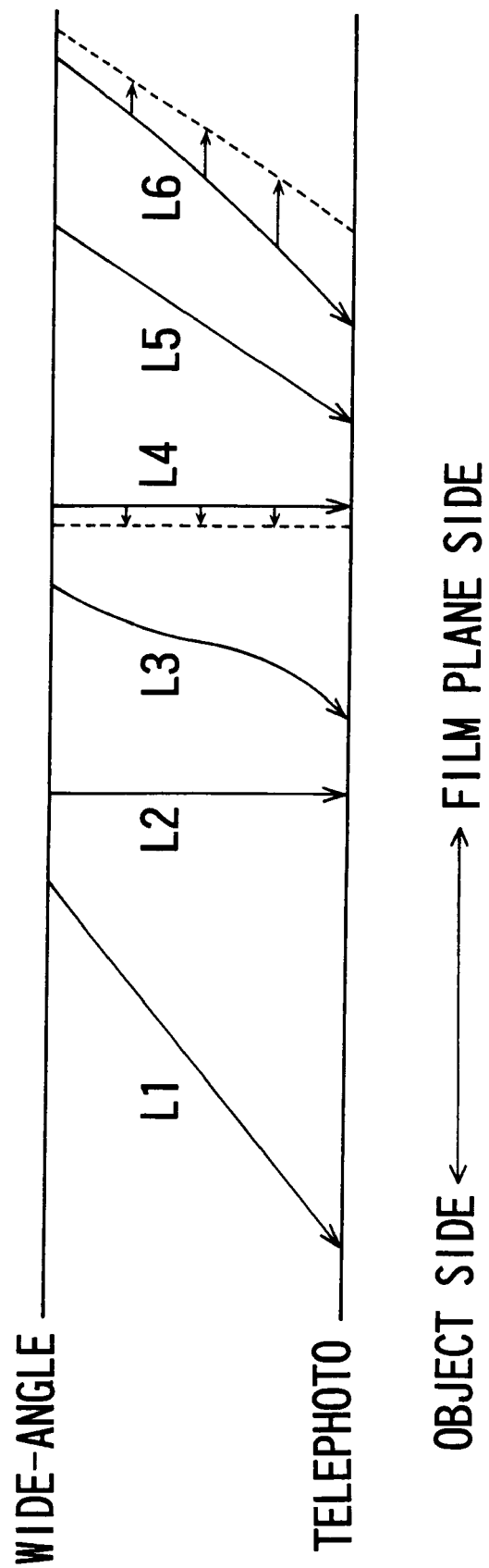

LENS BARREL AND OPTICAL APPARATUS

BACKGROUND OF THE INVENTION

1. Field of the Invention

The present invention relates to a lens barrel arranged to perform a magnification varying (zoom) action and a focus adjusting (focusing) action, and more particularly to a lens barrel in which a plurality of lens units are moved during the focus adjusting action.

2. Description of Related Art

Lens barrels capable of performing a zoom action have been popularly used. Many of the zoom lens barrels have recently come to be arranged to keep a focus state unvarying during a zoom action. For this purpose, for example, a non-linear focus cam (a range varying cam) is formed in a member such as a cam ring to be driven during a zoom action in such a way as to cause the axial moving range between infinity-distance and nearest-distance positions of a focusing lens unit which engages the focus cam to continuously vary according to the change of a focal length.

For example, in a lens barrel disclosed in Japanese Laid-Open Patent Application No. HEI 3-144411 (corresponding to U.S. Pat. No. 5,144,490), there are provided a zoom cam ring arranged to rotate in a predetermined position in an optical axis direction according to a zooming action, and a focus cam ring having a non-linear focus cam and arranged to rotate in association with the rotation of the zoom cam ring. In such a lens barrel, the initial position in the optical axis direction to be taken by the focusing lens unit for a zooming action is arranged to be variable and the moving range of the focusing lens unit for a focusing action is also arranged to be variable.

If an attempt to shorten a nearest focusable distance is furthered, it would become hardly possible to sufficiently remove aberration fluctuations for a lens barrel arranged to have only one focus lens unit vary its moving range according to the zooming action, like in the case of the one disclosed in the above Japanese Laid-Open Patent Application No. HEI 3-144411. In order to enhance the optical performance of a lens barrel, therefore, the lens barrel must be arranged either to drive a plurality of focusing lens units or to drive an aberration correcting lens unit arranged separately from a focusing lens unit in performing a focusing action.

To meet this requirement, there is a lens barrel arranged to drive a plurality of lens units in performing a focusing action, as disclosed, for example, in Japanese Patent Publication No. HEI 8-14651. In the case of this lens barrel, when a focusing operation ring is operated to rotate, a driving force in an optical axis direction is imparted to a focusing lens unit through a helicoid cam, and, then, by using the movement of the focusing lens unit in the optical axis direction, a rotative driving force is obtained and applied to an aberration correcting lens unit. The aberration correcting lens unit, which is arranged to be rotated by the rotative driving force, is caused to move also in the optical axis direction through its engagement with an aberration correcting cam.

However, to obtain the rotative driving force on the aberration correcting lens unit by using the movement of the focusing lens unit in the optical axis direction, the lens barrel disclosed in the above Japanese Patent Publication No. HEI 8-14651 necessitates a complex structural arrangement. More specifically, the lens barrel is provided for this purpose with a rectilinear motion tube which is arranged to move in the optical axis direction together with the focusing lens unit and to have a projection on its outer circumferential side. The projection is arranged to engage a cam obliquely formed in a rotation transforming tube which is arranged to be rotatable together with the aberration correcting lens unit. The complex structural arrangement tends to incur an increase in size of the lens barrel. Besides, that arrangement is hardly suited for enhancement of positional precision of the aberration correcting lens unit.

BRIEF SUMMARY OF THE INVENTION

The invention is directed to the solution of the above-stated problems. Therefore, it is a first object of the invention to provide a lens barrel which is capable of accurately driving a plurality of lens units during a focusing action with simple arrangement and also an optical apparatus which uses the lens barrel.

To attain the above object, in accordance with an aspect of the invention, there is provided a lens barrel which comprises a plurality of lens units, a plurality of cams arranged to respectively cause the plurality of lens units which are being rotated around an optical axis during a focusing action to move in the optical axis direction, at least one of the plurality of cams being a range varying cam which causes a moving range of the associated lens unit to vary according to a magnification varying state, and a rotary driving member arranged to be rotated around the optical axis by a manual operation or by a motor, wherein the plurality of lens units are interlinked with the rotary driving member in such a way as to be movable in the optical axis direction relative to the rotary driving member independently of each other and rotatable integrally with the rotary driving member.

In other words, in the lens barrel according to the invention, a driving mechanism is simplified by arranging the rotary driving member to impart a rotating force to each of the plurality of lens units which have different moving ranges when the rotary driving member receives a rotating force either from an operation ring or from a motor.

The rotary driving member may be connected to each of the lens units in any suitable manner. In a preferred manner, for example, a groove part is formed in the rotary driving member to extend in the optical axis direction, and engaging parts provided in the lens units are inserted into the groove part to be movable in the optical axis direction and are then caused to engage the groove part in the direction of rotation. This method may be changed to connect only a specific lens unit or units among the plurality of lens units to the rotary driving member in the above-stated manner while the others are connected to the specific lens unit in such a way as to be rotatable integrally with the specific lens unit.

Further, the rotary driving member may be composed of a body part which is arranged to rotate at a predetermined position of the optical axis direction and a movable part which is arranged to be movable relative to the body part in the optical axis direction. In this case, a specific lens unit among the plurality of lens units is integrally attached to the movable part, and the other lens units are provided with engaging parts which are held by the body part and the movable part to be movable in the optical axis direction and which engage the body part and the movable part in the direction of rotation.

Further, in a case where the lens barrel is provided with a magnification varying cam ring arranged to be driven during a magnification varying action for causing a magnification varying lens unit to be moved in the optical axis direction through a magnification varying cam, the above-stated range varying cam may be formed in the magnification varying cam ring to drive a magnification-varying and focusing lens unit while other cams are arranged to be used for driving an aberration correcting lens unit.

The lens barrel according to the invention can be arranged to have all the plurality of cams except the range varying cam formed either in the lens barrel body or in a fixed tube which is fixed to the lens barrel body. Unlike the conventional lens barrels, this arrangement obviates the necessity of some additional members such as aberration correcting cam ring, etc., to permit the lens barrel to be more simply arranged and yet to be capable of adequately driving a plurality of lens units. Besides, with the cams formed either in the lens barrel body which is the base of the lens barrel or in a fixed tube, the position control over the aberration correcting lens unit, etc., can be accurately accomplished.

The plurality of lens units which are driven during a focusing action may be the second or subsequent lens units which are smaller and lighter than the first lens unit disposed at a frontmost position of the optical axis direction, so that a power required to drive the lens unit can be reduced for reduction in size of a driving motor or the like.

Further, in accordance with another aspect of the invention, the lens barrel is provided with a magnification varying cam ring which is arranged to be driven during a magnification varying action for causing the magnification varying lens unit to be moved in the optical axis direction through the magnification varying cam, and a focusing cam ring or a plurality of focusing cam rings which are arranged to be driven integrally with the magnification varying cam ring. The range varying cam is formed either in each of the plurality of focusing cam rings or in each of the magnification varying cam ring and the focusing cam ring.

In short, according to the invention, there is realized a lens barrel which excels in optical performance and which permits shortening the nearest focusable distance as well as reduction in aberration fluctuations with the movable range of a plurality of focusing (or magnification-varying and focusing) lens units arranged to be variable according to the magnification varying state of the magnification varying action.

The above and other objects and features of the invention will become apparent from the following detailed description of embodiments thereof taken in connection with the accompanying drawings.

BRIEF DESCRIPTION OF THE SEVERAL VIEWS OF THE DRAWING

FIG. 2 is a development view showing an operating state of the lens barrel during zooming.

FIG. 4 is a diagram showing movements of various lens units taking place when the lens barrel is in process of zooming and focusing.

DETAILED DESCRIPTION OF THE INVENTION

Preferred embodiments of the invention will be described below in detail with reference to the drawings.

Figure 1:
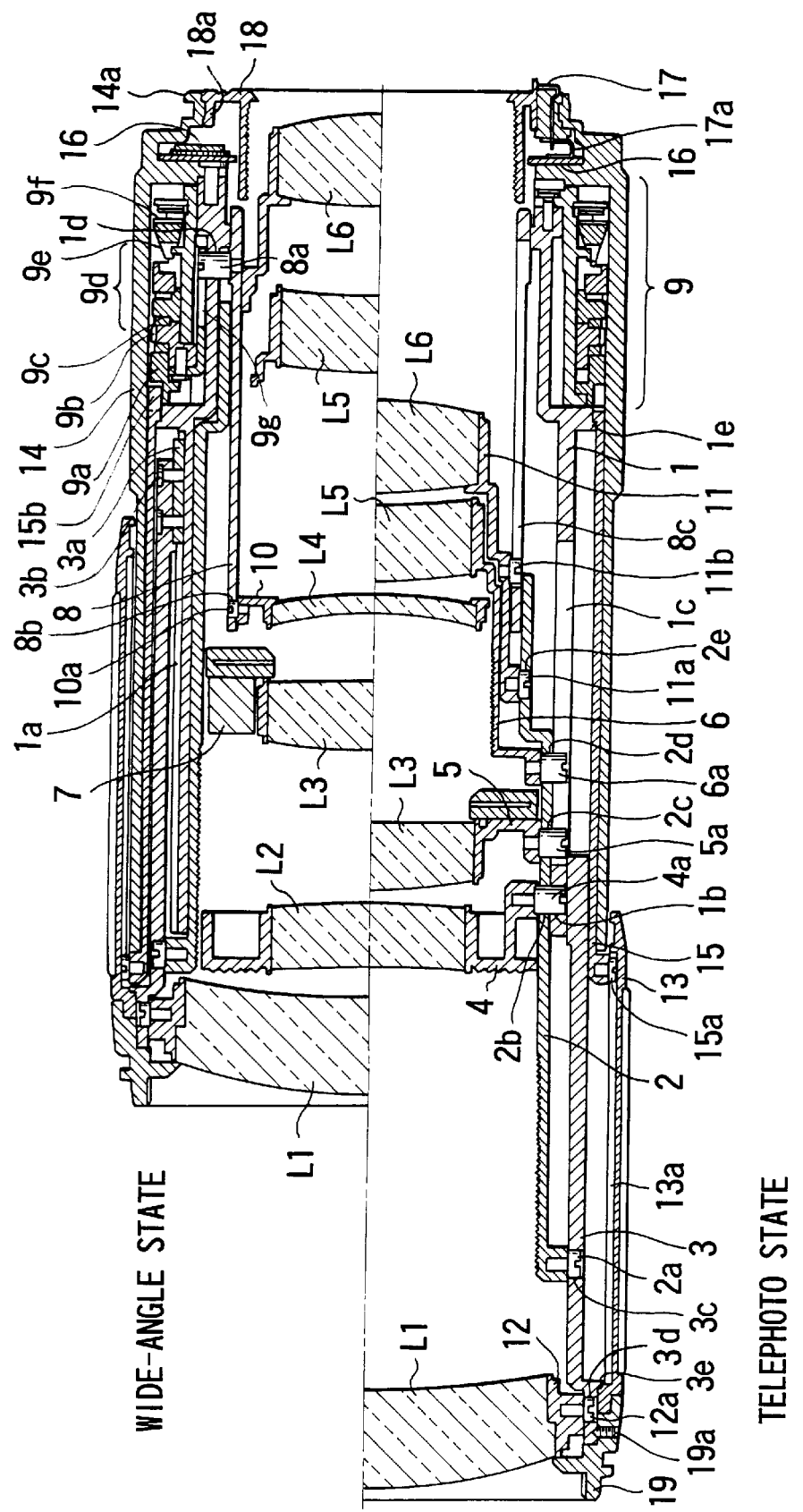
FIG. 1 is a sectional view showing a lens barrel according to a first embodiment of the invention.
Figure 3A:
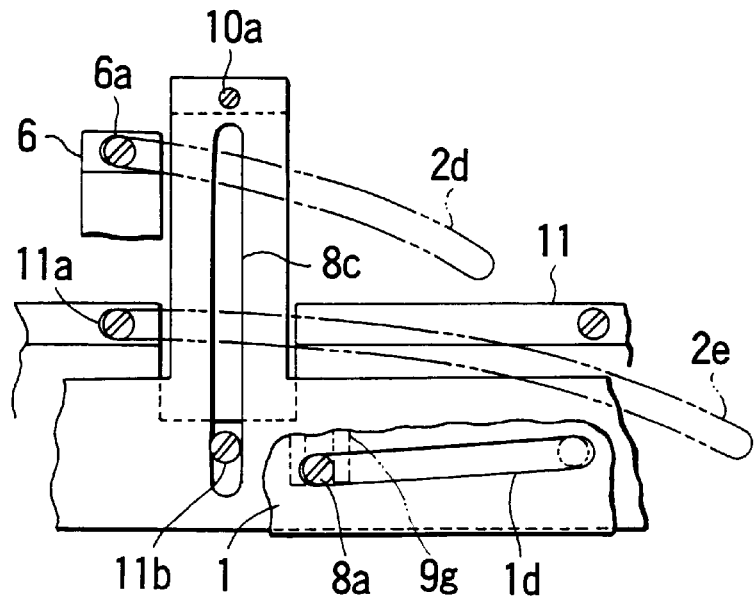
FIGS. 3(a) and 3(b) are development views showing the operating states of the lens barrel during focusing.
Figure 3B:
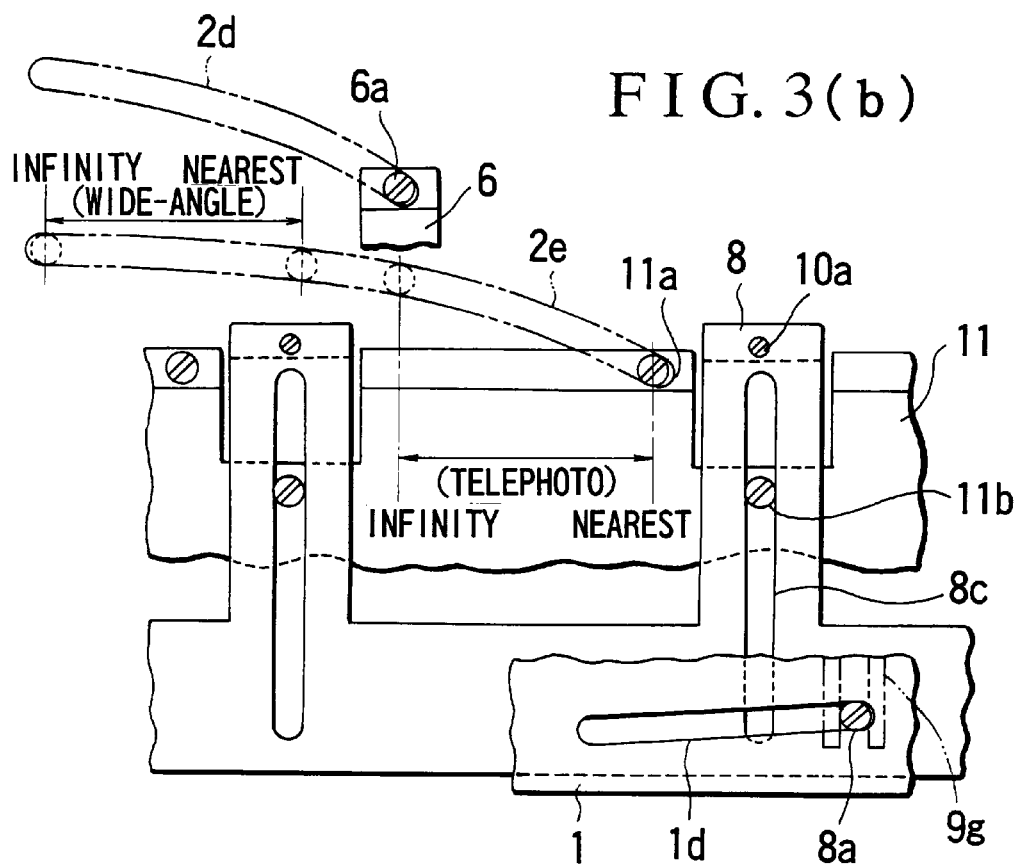

FIG. 1 is a sectional view of an interchangeable zoom lens barrel which is adapted for a single-lens reflex camera and arranged according to the invention as a first embodiment thereof. In FIG. 1, a part above a center line shows the zoom lens barrel in a wide-angle position, and a part below the center line shows the zoom lens barrel in a telephoto position. FIG. 2 shows in a development view an operating state of the zoom lens barrel during zooming. FIGS. 3(a) and 3(b) are development views respectively showing operating states of the zoom lens barrel during focusing.

In these figures, reference numeral 1 denotes a fixed tube which is secured to the inner side of a shell ring 14 which is the body of the lens barrel. A zooming cam ring 2 is held on the inner side of the fixed tube 1 in such a way as to be rotatable around an optical axis and movable in the optical axis direction.

The shell ring 14 and the fixed tube 1 are secured to each other with screws. Bayonet claws 14a are arranged in the rear part of the shell ring 14 to engage a camera body which is not shown. A back cover 18 is attached to the shell ring 14 by utilizing the elasticity of claws 18a which are provided on the back cover 18.

A rectilinear motion tube 3 is mounted on the outer side of the fixed tube 1 in such a way as to be movable in the optical axis direction. A rectilinear motion key 3a is secured with screws 3b to the rear inner side of the rectilinear motion tube 3. The rectilinear motion key 3a engages a rectilinear motion groove part 1a formed in the outer circumference of the fixed tube 1. The rectilinear motion tube 3 is thus arranged to be movable in the optical axis direction in a state of having its rotation restricted relative to the fixed tube 1. A filter frame 19 is secured with set screws 19a to the front end of the rectilinear motion tube 3.

A first lens unit holding frame 12 holds a first lens unit Ll. A roller 12a is arranged on the outer circumference of the first lens unit holding frame 12 to engage a hole part 3d formed at the front end of the rectilinear motion tube 3. A non-linear cam 3c is formed in a rear part of the rectilinear motion tube 3. A roller 2a is arranged at the front end of the zooming cam ring 2 to engage the non-linear cam 3c (see FIG. 2).

A second lens unit cam 2b, a third lens unit cam 2c and a fifth lens unit cam 2d are arranged in the optical axis direction in an intermediate part of the zooming cam ring 2. Among these cams, a roller 4a which is mounted on a second lens unit holding frame 4 which holds a second lens unit L2 engages the second lens unit cam 2b. The roller 4a also engages a holding hole part 1b formed in the front end of the fixed tube 1. By this arrangement, the second lens unit L2 and the second lens unit holding frame 4 are always fixed to the fixed tube 1. A focusing cam 2e (serving as a range varying cam) is formed in a rear part of the zooming cam ring 2.

A third lens unit holding frame 5 holds a third lens unit L3. A roller 5a is mounted on the outer circumference of the third lens unit holding frame 5. A fifth lens unit holding frame 6 holds a fifth lens unit L5. A roller 6a is mounted on the outer circumference of the fifth lens unit holding frame 6. The rollers 5a and 6a respectively engage the third lens unit cam 2c and the fifth lens unit cam 2d which are provided in the zooming cam ring 2 and also engage a rectilinear motion groove part 1c which is provided in the fixed tube 1 for both the third and fifth lens units L3 and L5 in common.

A known electromagnetic diaphragm unit 7 is secured to the third lens unit holding frame 5 and is arranged to move integrally therewith.

A focus tube 8 is provided with a holding hole part 8b, which is formed in a front end part of the focus tube 8. A roller 10a which is provided on the outer circumference of a fourth lens unit holding frame 10 which holds a fourth lens unit L4 engages the holding hole part 8b of the focus tube 8. The fourth lens unit holding frame 10 is thus integrally held by the focus tube 8. Further, the focus tube 8 is rotatably fitted in the inner side of the fixed tube 1. A focus roller 8a is arranged on the outer circumference of a rear part of the focus tube 8 to engage an aberration correcting cam 1d which is formed in a rear part of the fixed tube 1.

In this case, the fourth lens unit L4 is arranged to remain stationary during zooming but to move forward during focusing as the focusing position shifts from an infinity distance position toward a nearest distance position, thereby functioning as a floating lens for correcting the aberrations of the entire optical system of the lens barrel. For this purpose, the aberration correcting cam 1d of the fixed tube 1 is formed to have an inclination corresponding to moving amounts of the fourth lens unit L4 set for object distances. In the case of the embodiment, the aberration correcting cam 1d is arranged to have a uniform lead. However, this arrangement may be changed to form the cam 1d in a non-linear shape.

A sixth lens unit holding frame 11 is arranged to hold a sixth lens unit L6 which is a focus adjusting lens, i.e., a focusing lens. A roller 11a which is provided on the outer circumference of a front part of the sixth lens unit holding frame 11 engages the focus cam 2e which is formed in the zooming cam ring 2. A roller 11b which is provided on the outer circumference of a middle part of the fifth lens unit holding frame 11 engages a rectilinear motion groove part 8c formed in the focus tube 8.

An operation ring 13 is rotatably held by the outer circumference of a front end of the rectilinear tube 3. The operation ring 13 is arranged to be only rotatable in a state in which its movement in the optical axis direction is restrained jointly by a rear end part of the filter frame 19 and a flange part 3e of the rectilinear motion tube 3.

A connection ring 15 has its rear end part rotatably engage a middle part of the fixed tube 1. A roller 15a is mounted on the outer circumference of a front end of the connection ring 15. The roller 15a engages a rectilinear motion groove part 13a formed in the inner circumference of the operation ring 13. The connection ring 15 is arranged to be only rotatable in a state in which its movement in the optical axis direction is restrained jointly by a flange part 1e of the fixed tube 1 and the front end of the shell ring 14. A protruding part 15b is provided on the inner circumference of the rear end of the connection ring 15. The protruding part 15b engages a manual ring 9a provided within a vibration wave motor unit 9.

The vibration wave motor unit 9 is composed of the above-stated manual ring 9a, a stator 9e which is arranged to be excited to vibrate by a piezoelectric element which is not shown, a rotor 9d which is pushed against the stator 9e by a belleville spring 9f, a plurality of rollers 9c which are arranged to be in contact with the rotor 9d and the manual ring 9a, and an output ring 9b which holds the rollers 9c for rotation.

A focus key 9g (serving as a rotary driving member) which extends rearward in the optical axis direction is secured to the output ring 9b with screws. The focus key 9g is provided with a groove part which is formed to extend in the optical axis direction, as shown in FIG. 2. The roller 8a of the focus tube 8 engages that groove part. Therefore, in the case of the lens barrel according to the first embodiment, even while the vibration wave motor unit 9 is caused to rotate by automatic focusing, the output ring 9b can be rotated by causing the manual ring 9b to rotate by a manual operation. By virtue of this arrangement, focus adjustment can be accomplished without recourse to a change-over action of a clutch or the like.

Reference numeral 16 denotes a circuit board. Electric wiring (not shown) for the electromagnetic diaphragm unit 7 and the vibration wave motor unit 9, and a control unit (not shown) which is arranged to control these units 7 and 9, are mounted on the circuit board 16.

Reference numeral 17 denotes a contact part which is provided for signal transmission between the camera body and the circuit board 16 and for receiving electric power. The contact part 17 is provided with a flexible printed circuit board 17a which electrically connects the contact part 17 to the circuit board 16.

With the lens barrel configured as described above, the zooming action and the focusing action of the lens barrel are next described. In the case of the lens barrel according to the first embodiment, a one-ring type rectilinear zooming arrangement allows a zooming action to be carried out by moving the operation ring 13 in the optical axis direction. A focusing action can be carried out by turning the operation ring 13. The focusing action can be carried out also by energizing the vibration wave motor unit 9.

When the operation ring 13 is moved in the optical axis direction for the purpose of zooming, the first lens unit L1 and the rectilinear motion tube 3 also move in the optical axis direction together with the operation ring 13. With the rectilinear motion tube 3 moved in the optical axis direction, the roller 2a which engages the cam 3c causes the zooming cam ring 2 to move also in the optical axis direction. Further, the engagement of the cam 2b with the roller 4a causes the zooming cam ring 2 to rotate along the cam 2b while the zooming cam ring 2 is moving in the optical axis direction.

When the zooming cam ring 2 is thus drawn out while being rotated, the engagement of the third lens unit cam 2c and the fifth lens unit cam 2d with the rollers 5a and 6a causes the third lens unit L3 and the fifth lens unit L5 to move in the optical axis direction. Further, the engagement of the focus cam 2e with the roller 11a causes the sixth lens unit L6 to move in the optical axis direction while the sixth lens unit L6 is guided by the rectilinear motion groove part 8c of the focus tube 8. These motions of the lens units L1, L3, L5 and L6 contribute to the variation of the focal length.

On the other hand, when the operation ring 13 is turned around the optical axis for the purpose of focusing, the manual ring 9a is caused to be rotated through the connection ring 15. With the manual ring 9a rotated, a mechanism which is the same as a retainer in a bearing causes the output ring 9b to rotate just one half of the angle of rotation of the manual ring 9a. Further, even if the rotor 9d is caused to rotate by energizing the vibration wave motor unit 9 (by a method which is well known and, therefore, the details thereof are omitted from description), a mechanism similar to the above-stated mechanism causes the output ring 9b to rotate just one half of the angle of rotation of the rotor 9d.

The rotation of the output ring 9b is then transmitted through the focus key 9g and the roller 8a to the focus tube 8 and the fourth lens unit L4 which is fixed to the focus tube 8. The focus tube 8 and the fourth lens unit L4 are thus rotated. Then, the engagement of the roller 8a with the aberration correcting cam 1d formed in the fixed tube 1 causes the focus tube 8 and the fourth lens unit L4 being rotated to move in the optical axis direction. Further, the engagement of the rectilinear motion groove part 8c of the focus tube 8 with the roller 11b causes only the rotation of the focus tube 8 to be transmitted to the sixth lens unit L6. The engagement of the focus cam 2e with the roller 11a then causes the sixth lens unit L6 to be drawn out while being rotated. The fourth lens unit L4 and the sixth lens unit L6 thus function as the focusing lens units.

As described above, the focus key 9g is arranged to receive either the rotation of the operation ring 13 or that of the vibration wave motor unit 9 and to impart a rotating force directly to the focus tube 8, to the fourth lens unit L4 which is fixed to the focus tube 8 and to the sixth lens unit L6. By virtue of this arrangement, the driving mechanism of the lens barrel according to the first embodiment can be simplified, and the positions of the two lens units L4 and L6 can be accurately controlled.

Further, the arrangement for forming the aberration correcting cam 1d in the fixed tube 1 obviates the necessity of use of any additional member such as an aberration correcting cam ring or the like. Therefore, a plurality of lens units can be driven for focusing with a simple structural arrangement. Besides, since the fixed tube 1 serves as the base of the lens barrel, the arrangement for forming the aberration correcting cam 1d in the fixed tube 1 permits accurate control over the position of the fourth lens unit L4.

Both the lens units L4 and L6 which are to be driven during focusing are smaller and lighter than the first lens unit L1 which has the largest diameter. Therefore, the required amount of driving output from the vibration wave motor unit 9 can be allowed to be relatively small. The vibration wave motor unit 9 thus can be arranged in a smaller size, thereby contributing to a reduction in size of the lens barrel.

FIG. 4 shows the movement of each of the lens units of the lens barrel which is composed of six lens units. As apparent from FIG. 4, in zooming, the second and fourth lens units L2 and L4 remain stationary while the first, third, fifth and sixth lens units L1, L3, L5 and L6 move in the optical axis direction independently of each other.

In FIG. 4, broken lines indicate the positions of the fourth and sixth lens units L4 and L6 obtained in the optical axis direction during focusing. The sixth lens unit L6 moves also in zooming. The range of use of the focus cam 2e is arranged to vary according to zooming positions. The drawn-out amount of the sixth lens unit L6 for focusing from an infinity distance position to a nearest distance position is thus arranged to increase accordingly as the zooming position comes nearer to a telephoto end position, as shown in FIG. 3(b). Further the fourth lens unit L4 moves at a fixed drawn-out rate for the object distance irrespective of zooming positions.

In the first embodiment, the rollers 11a and 11b which are provided on the sixth lens unit holding frame 11 are arranged as separate members. However, the arrangement may be changed to make the roller 11a extend rearward in the optical axis direction in such a way as to engage both the focus cam 2e and the rectilinear motion groove part 8c of the focus tube 8.

It is also possible to omit the focus tube 8, to mount the roller 8a directly on the fourth lens unit holding frame 10, to provide an escape hole in the fixed tube 1, and to arrange the roller 11a of the sixth lens unit holding frame 11 to engage both the focus cam 2e and the focus key 9g, so that the fourth lens unit holding frame 10 and the sixth lens unit holding frame 11 may be driven to rotate directly by the focus key 9g.

Figure 5:
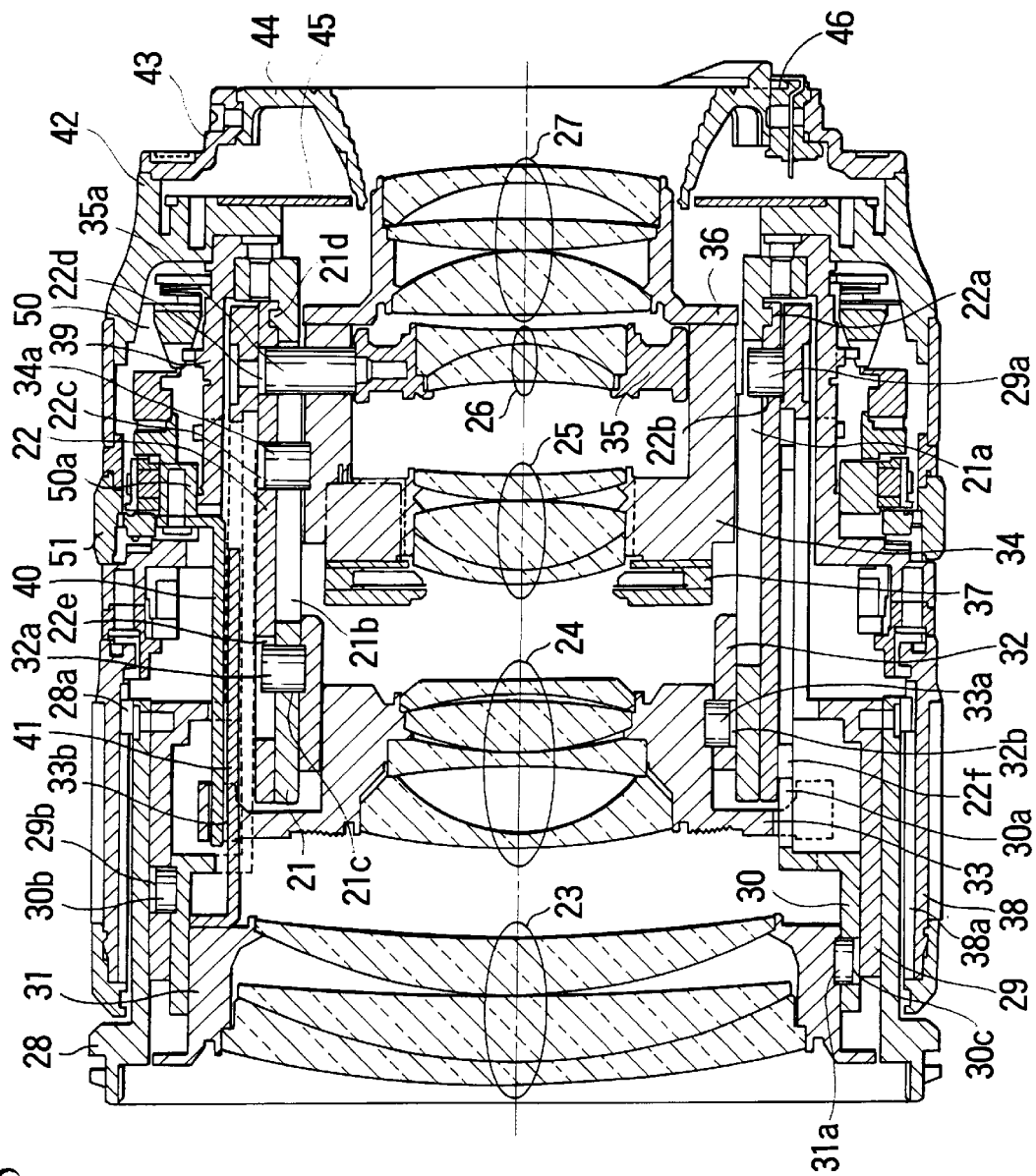
FIG. 5 is a sectional view showing a lens barrel according to a second embodiment of the invention in a wide-angle position.
Figure 6:
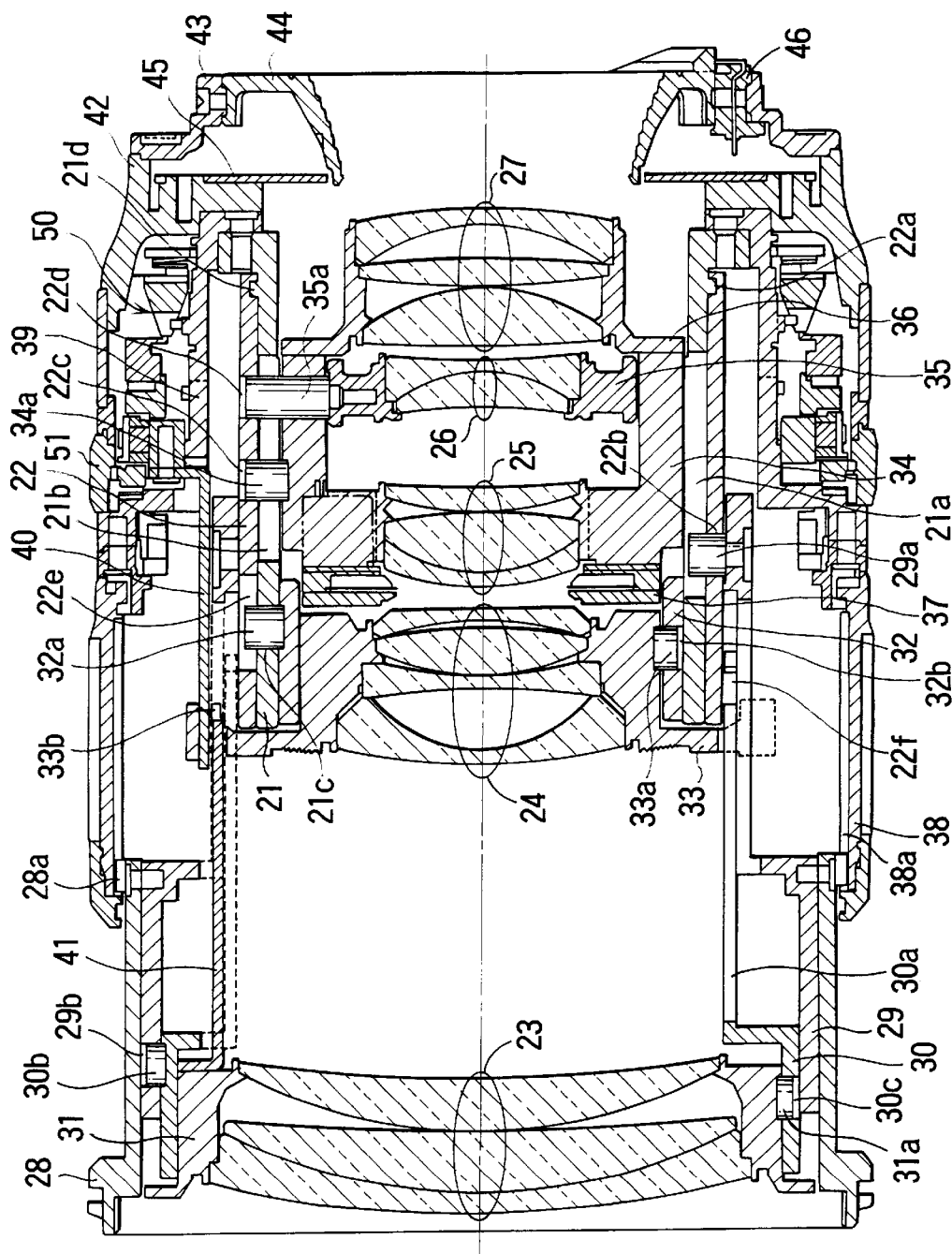
FIG. 6 is a sectional view showing the lens barrel according to the second embodiment of the invention in a telephoto position.
Figure 7:
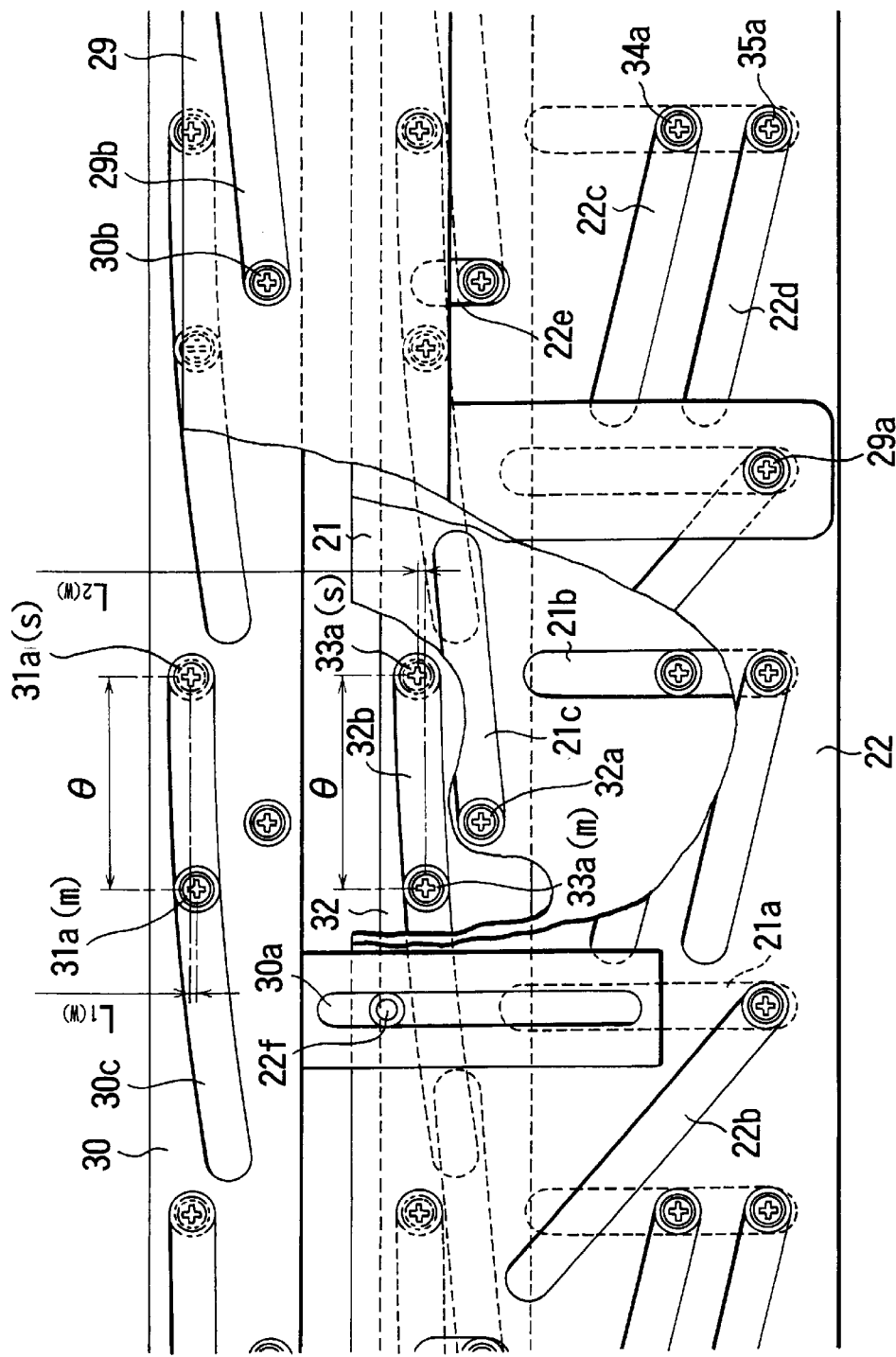
FIG. 7 is a development view showing an operating state of the lens barrel according to the second embodiment in a wide-angle position.
Figure 8:
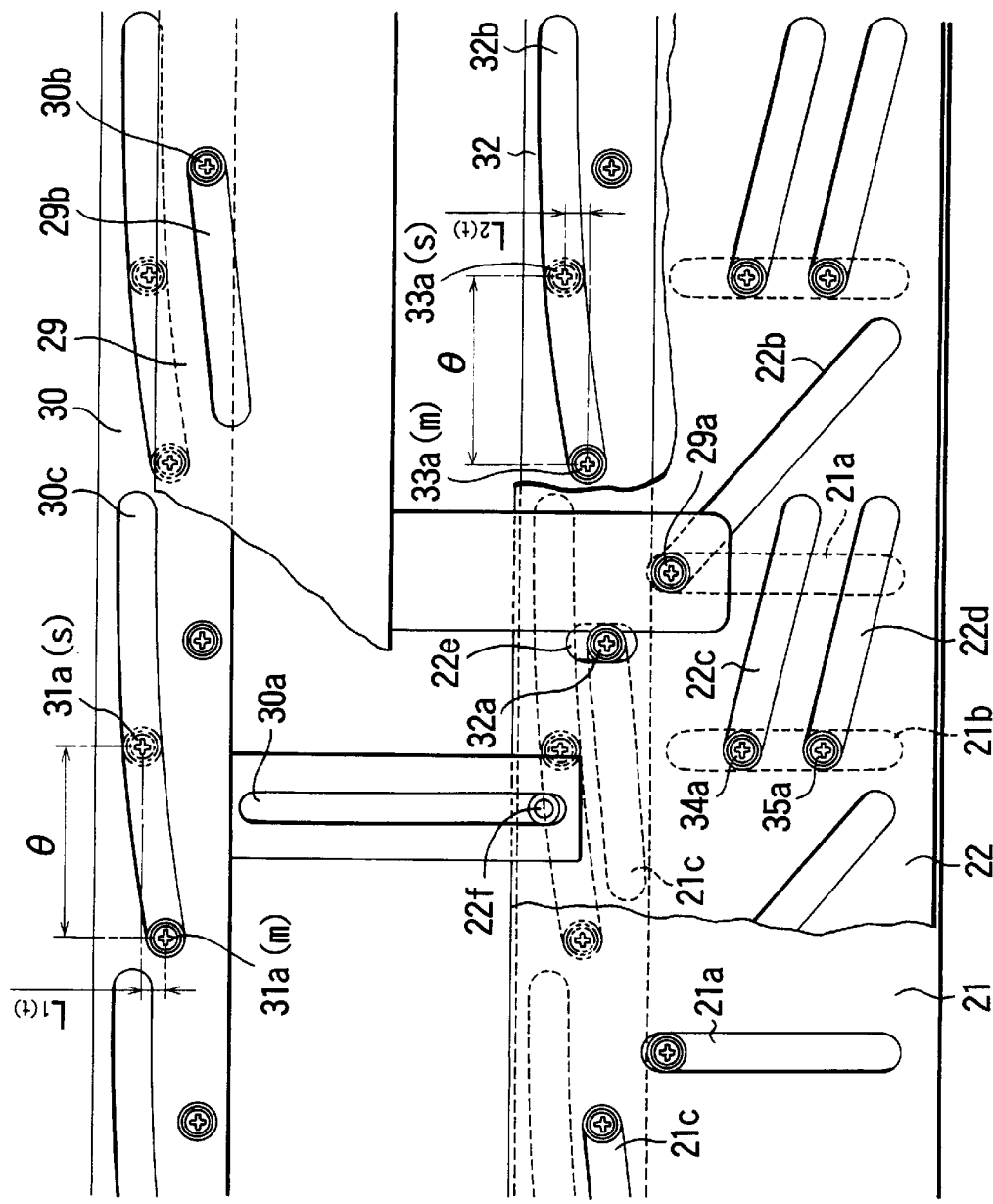
FIG. 8 is a development view showing an operating state of the lens barrel according to the second embodiment in a telephoto position.

FIGS. 5 and 6 show in sectional views an interchangeable zoom lens barrel which is adapted for a single-lens reflex camera and arranged according to the invention as a second embodiment thereof. FIGS. 7 and 8 are development views showing the driving mechanism of the zoom lens barrel. FIGS. 5 and 7 show the zoom lens barrel in a wide-angle position. FIGS. 6 and 8 show the lens barrel in a telephoto position.

In these figures, reference numeral 21 denotes a fixed tube. The fixed tube 21 is provided with three rectilinear motion groove parts 21a, three rectilinear motion groove parts 21b, a zoom correcting cam 21c and a projection 21d.

A zooming cam ring 22 is rotatably mounted on the outer circumference of the fixed tube 21. However, since the projection 21d provided on the fixed tube 21 engages a circumferential groove part 22a formed on the inner circumference of the rear part of the zooming cam ring 22, the zooming cam ring 22 is allowed to rotate around an optical axis at a given position of the optical axis direction. The zooming cam ring 22 is provided with three cams 22b for a first lens unit 23, three cams 22c for third and fifth lens units 25 and 27, three cams 22d for a fourth lens unit 26, three rectilinear motion groove parts 22e, and a projection 22f.

The first lens unit 23 is provided both for focusing and zooming. A second lens unit 24 is provided also both for focusing and zooming. The third, fourth and fifth lens units 25, 26 and 27 are provided for zooming. The third and fifth lens units 25 and 27 are integrally held by holding frames 34 and 36.

A first rectilinear motion tube 28 and a second rectilinear motion tube 29 are united in one body. The first rectilinear motion tube 28 is provided with a projection 28a which engages an inner circumferential lead 38a formed in a zoom operation ring 38. The second rectilinear motion tube 29 is provided with a zoom correcting cam 29b.

A first focusing cam ring 30 is provided with a vertical groove part 30a which engages the projection 22f of the cam ring 22, a roller 30b which engages the zoom correcting cam 29b of the second rectilinear motion tube 29, and a focus cam 30c for driving a first lens unit holding frame 31 for the first lens unit 23.

The first lens unit holding frame 31 holds the first lens unit 23. The first lens unit holding frame 31 is provided with a roller 31a which engages the first lens unit focus cam 30c of the first focusing cam ring 30.

A second focusing cam ring 32 is rotatably fitted in the inner circumference of the fixed tube 21. The second focusing cam ring 32 is provided with a roller 32a which engages the zoom correcting cam 21c of the fixed tube 21 and the rectilinear motion groove part 22e of the cam ring 22, and a focus cam 32b for the second lens unit 24.

A second lens unit holding frame 33 holds the second lens unit 24. The second lens unit holding frame 33 is provided with a roller 33a which engages the second lens unit focus cam 32b formed in the second focusing cam ring 32, and an engaging hole part 33b which engages a focus key 40 and a focus lever 41.

A third lens unit holding frame 34 holds the third lens unit 25 and is rotatably fitted in the inner circumference of the fixed tube 21. The third lens unit holding frame 34 is provided with three rollers 34a which engage the rectilinear motion groove parts 21b formed in the fixed tube 21 and the cams 22c formed in the cam ring 22.

A fourth lens unit holding frame 35 holds the fourth lens unit 26 and is rotatably fitted in the inner circumference of the third lens unit holding frame 34. The fourth lens unit holding frame 35 has three rollers 35a which engage the rectilinear motion groove parts 21b formed in the fixed tube 21 and the cams 22d formed in the cam ring 22.

A fifth lens unit holding frame 36 holds the fifth lens unit 27 and is integrally attached to the third lens unit holding frame 34.

A known electromagnetic diaphragm 37 is secured to the third lens unit holding frame 36 and is electrically connected to a circuit board 45 through a flexible circuit board which is not shown.

A zoom operation ring 38 is mounted on a focus unit support tube 39 in such a way as to be rotatable only and has the lead 38a on its inner circumference.

The focus unit support tube 39 supports a vibration wave motor 50 and a focusing operation ring 51. The vibration wave motor 50 is composed, in the same manner as in the case of the first embodiment, of a manual ring which engages the focusing operation ring 51 to be rotatable integrally therewith, a stator which is arranged to bring about vibration, a rotor which is arranged to be pressed into contact with the stator, a plurality of rollers which are in contact with the rotor and the manual ring, and an output ring 50a which rotatably holds these rollers.

The focus key 40 (serving as a body part of a rotative driving member) has its base end part secured to the output ring 50 with a screw. The focus key 40 extends forward in the optical axis direction and has its fore end part inserted into an engaging hole part 33b of the second lens unit holding frame 33.

The focus lever 41 (serving as a movable part of the rotative driving member) has its base end part secured to the first lens unit holding frame 31. The focus lever 41 extends rearward in the optical axis direction and has its rear end parts inserted into the engaging hole part 33b of the second lens unit holding frame 33 in such a way as to overlap the focus key 40 there.

A shell ring 42 is arranged to support the fixed tube 21, the focus unit support tube 39 and a mount 43.

The mount 43 is mechanically connected to a camera body which is not shown. Electrical contacts 46 are provided on the mount 43 for communication between a back cover 44 and the camera body.

A circuit board 45 is electrically connected to an electromagnetic diaphragm 37, the vibration wave motor 50 and the electrical contacts 46 through a flexible circuit board which is not shown. A microcomputer is mounted on the circuit board and is arranged to control these parts.

With the lens barrel configured as described above, the zooming action and the focusing action are next described as follows. When the zoom operation ring 38 is turned for zooming, the inner circumferential lead 38a rotates. However, since the projection 29a formed on the second rectilinear motion tube 29 engages the rectilinear motion groove part 21a of the fixed tube 21 to restrain the first and second rectilinear motion tubes 28 and 29 from rotating, the engagement of the inner circumferential lead 38a with the projection 28a of the first rectilinear motion tube 28 causes the rectilinear motion tubes 28 and 29 to move straight in the optical axis direction.

With the second rectilinear motion tube 29 moved straight, the zooming cam ring 22 which is restrained from moving in the optical axis direction by the engagement with the projection 21d of the fixed tube 21 is caused by the engagement of the projection 29a with the cam 22b to rotate to a degree as much as the extent of the straight motion of the second rectilinear motion tube 29.

With the zooming cam ring 22 thus caused to rotate, the engagement of the projection 22f of the zooming cam ring 22 with the vertical groove part 30a of the first focus cam ring 30 causes the first focus cam ring 30 to rotate integrally with the zooming cam ring 22 to the same degree. Then, the first focus cam ring 30, which is rotating, is caused by the engagement of the roller 30b with the zoom correcting cam 29b of the second rectilinear motion tube 29 to move straight in the optical axis direction.

During zooming, since the first lens unit holding frame 31 is restrained from rotating as the focus lever 41 which is fixed to the first lens unit holding frame 31 engages the output ring 50a through the engaging hole part 33b of the first lens unit holding frame 33 and the focus key 40, the engagement of the roller 31a with the first lens unit focus cam 30c causes the first lens unit holding frame 31 to move straight in the optical axis direction relative to the first focus cam ring 30 to an extent as much as the degree to which the first focusing cam ring 30 has rotated. Further, as the roller 31a of the first lens unit holding frame 31 moves along the first lens unit focus cam 30c, the range of use of the first lens unit focus cam 30c for focusing is varied.

Further, with the zooming cam ring 22 rotated, the engagement of the roller 32a with the rectilinear motion groove part 22e of the zooming cam ring 22 causes the second focusing cam ring 32 to rotate integrally with the zooming cam ring 22 to the same degree as the zooming cam ring 22. While the second focusing cam ring 32 thus rotates, the engagement of the roller 32a with the zoom correcting cam 21c of the fixed tube 21 causes the second focusing cam ring 32 to move straight in the optical axis direction.

During zooming, the second lens unit holding frame 33 is restrained from rotating by the engagement with the output ring 50a through the focus key 40. Therefore, the engagement of the roller 33a with the second lens unit focus cam 32b causes the second lens unit holding frame 33 to move straight in the optical axis direction to an extent corresponding to the rotation of the second focusing cam ring 32. Furthermore, as the roller 33a moves along the second lens unit focus cam 32b, the range of use of the second lens unit focus cam 32b for focusing is varied.

Further, when the zooming cam ring 22 rotates, since the third lens unit holding frame 34 and the fourth lens unit holding frame 35 are restrained from rotating by the engagement of the rollers 34a and 35a with the rectilinear motion groove part 21b of the fixed tube 21, the third lens unit holding frame 34, the fifth lens unit holding frame 36 and the electromagnetic diaphragm 17 are driven to move together along the cam 22c, and the fourth lens unit holding frame 35 is driven to move along the cam 22d.

On the other hand, when the output ring 50a is rotated for focusing either by actuating the vibration wave motor 50 or by operating the focusing operation ring 51 to rotate, the rotating force of the output ring 50a is transmitted to the second lens unit holding frame 33 through the focus key 40 and the engaging hole part 33b and also to the first lens unit holding frame 31 through the engaging hole part 33b and the focus lever 41. As a result, the lens unit holding frames 31 and 33 are driven to rotate.

The lens barrel is thus arranged to impart a rotating force to the first and second lens units 23 and 24 by means of the focus key 40 and the focus lever 41 which receive the rotation of the vibration wave motor 50 or that of the focusing operation ring 51. By virtue of this arrangement, the driving mechanism of the lens barrel can be simplified and the positions of the lens units 23 and 24 can be accurately controlled.

First, when the first lens unit holding frame 31 rotates, the roller 31a moves along the first lens unit focus cam 30c of the first focusing cam ring 30. Then, the engagement of the roller 31a with the cam 30c causes the first lens unit holding frame 31 to move straight in the optical axis direction.

In focusing in a wide-angle position, the roller 31a can turn, as shown in FIG. 7, from an infinity distance position 31a(m) to a nearest distance position 31a(s) as much as a rotation angle θ. Here, for example, when the roller 31a turns to the extent of the rotation angle θ, the roller 31a (the first lens unit holding frame 31) moves straight in the optical axis direction to an extent of a distance L1(w).

Also, in focusing in a telephoto position, the roller 31a can turn, as shown in FIG. 8, from an infinity distance position 31a(m) to a nearest distance position 31a(s) as much as a rotation angle θ. Here, for example, when the roller 31a turns to the extent of the rotation angle θ, the roller 31a (the first lens unit holding frame 31) moves straight in the optical axis direction to an extent of a distance L1(t).

As apparent from FIGS. 7 and 8, the straight moving amount of the first lens unit holding frame 31 obtained by driving the roller 31a to the same rotation angle degree θ varies according to whether the lens barrel is in the wide-angle state or in the telephoto state. This is because, as mentioned in the description of the zooming action, the range of use of the first lens unit focus cam 30c varies with the position of zooming.

Further, when the second lens unit holding frame 33 rotates, on the other hand, the roller 33a moves along the second lens unit focus cam 32b of the second focusing cam ring 32. Then, the engagement of the roller 33a with the focus cam 32b causes the second lens unit holding frame 33 to move straight in the optical axis direction. In focusing in a wide-angle state, the roller 33a can turn, as shown in FIG. 7, from an infinity distance position 33a(m) to a nearest distance position 33a(s) as much as a rotation angle θ. Here, for example, when the roller 33a turns to the extent of the rotation angle θ, the roller 33a, i.e., the second lens unit holding frame 33, moves straight in the optical axis direction to an extent of a distance L2 (w).

Also, in focusing in a telephoto state, the roller 33a can turn, as shown in FIG. 8, from an infinity distance position 33a(m) to a nearest distance position 33a(s) as much as a rotation angle θ. Here, for example, when the roller 33a turns to the extent of the rotation angle θ, the roller 33a, i.e., the first lens unit holding frame 33, moves straight in the optical axis direction to an extent of a distance L2(t).

The straight moving amount of the second lens unit holding frame 33 obtained by driving the roller 33a to the same rotation angle degree θ varies according to whether the lens barrel is in the wide-angle state or in the telephoto state, because, as mentioned in the foregoing, the range of use of the second lens unit focus cam 32b varies according to the position of zooming.

As described above, the arrangement for varying the straight moving amounts of the two lens units 23 and 24 according to the position of zooming enables the lens barrel to excel in optical performance, having a less amount of aberration fluctuations and yet allowing a reduction in the nearest focusable distance.

Figure 9:
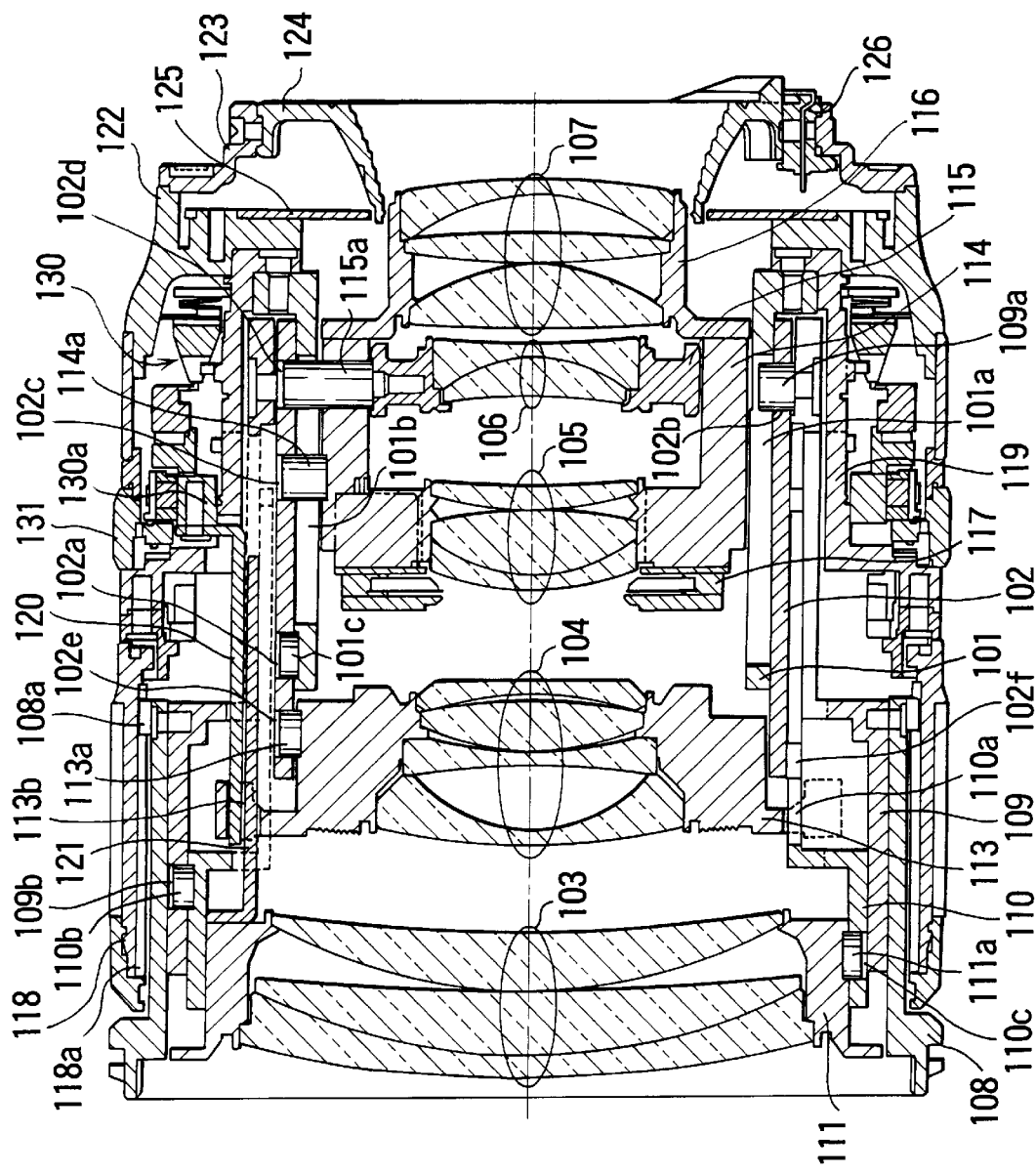
FIG. 9 is a development view showing a lens barrel according to a third embodiment of the invention in a wide-angle position.
Figure 10:
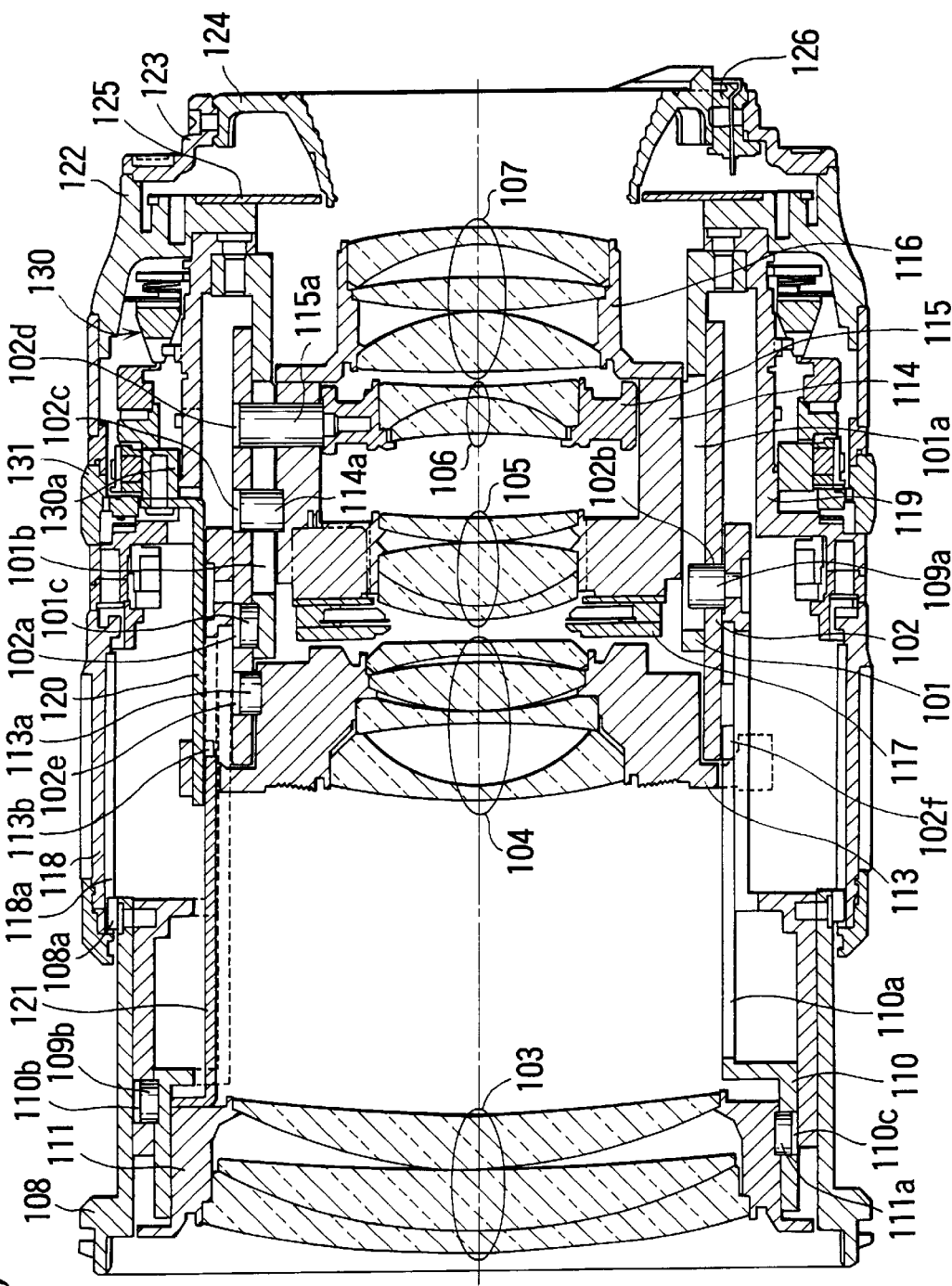
FIG. 10 is a sectional view showing the lens barrel according to the third embodiment of the invention in a telephoto position.
Figure 11:
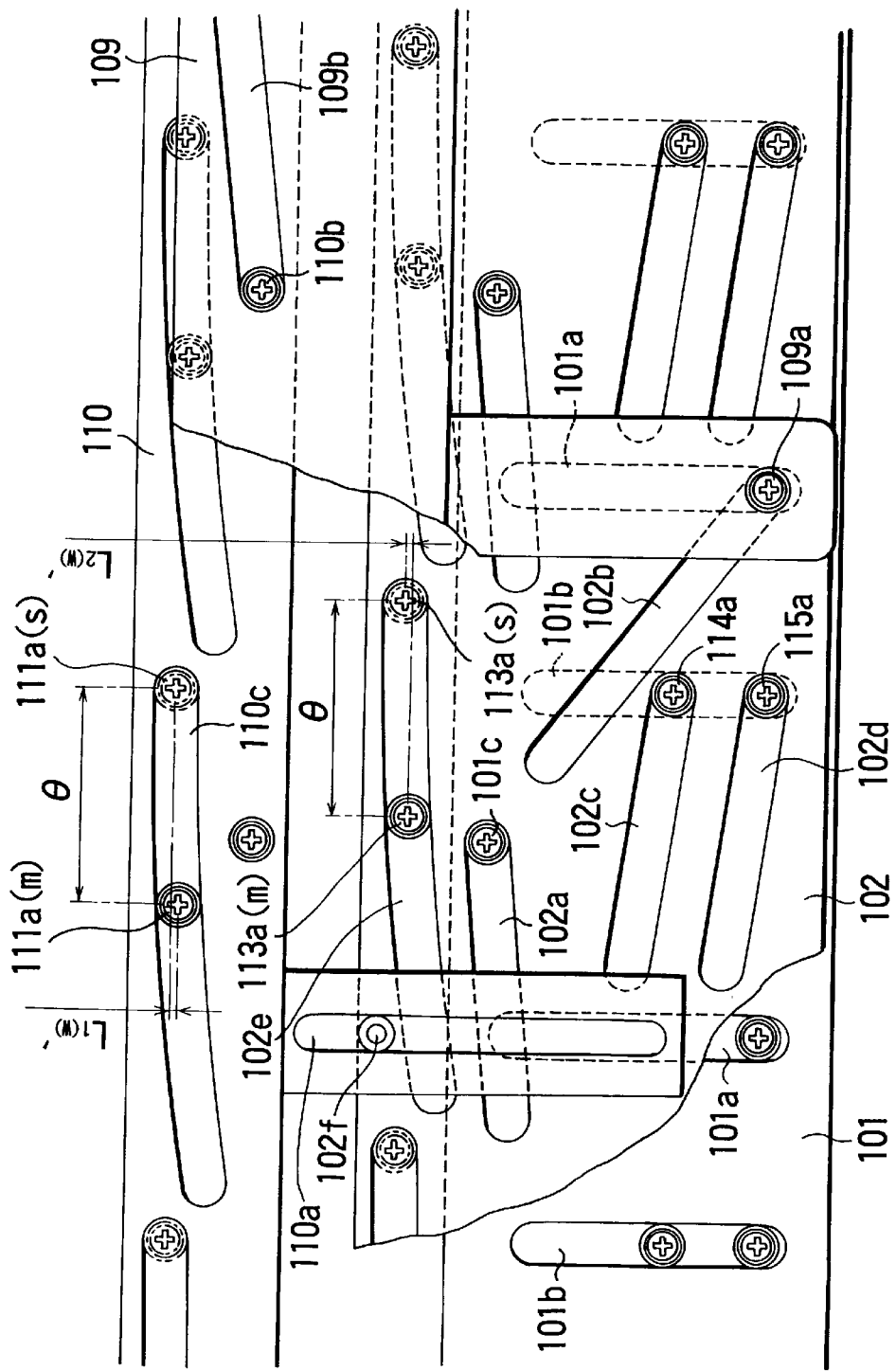
FIG. 11 is a development view showing an operating state of the lens barrel according to the third embodiment in a wide-angle position.
Figure 12:
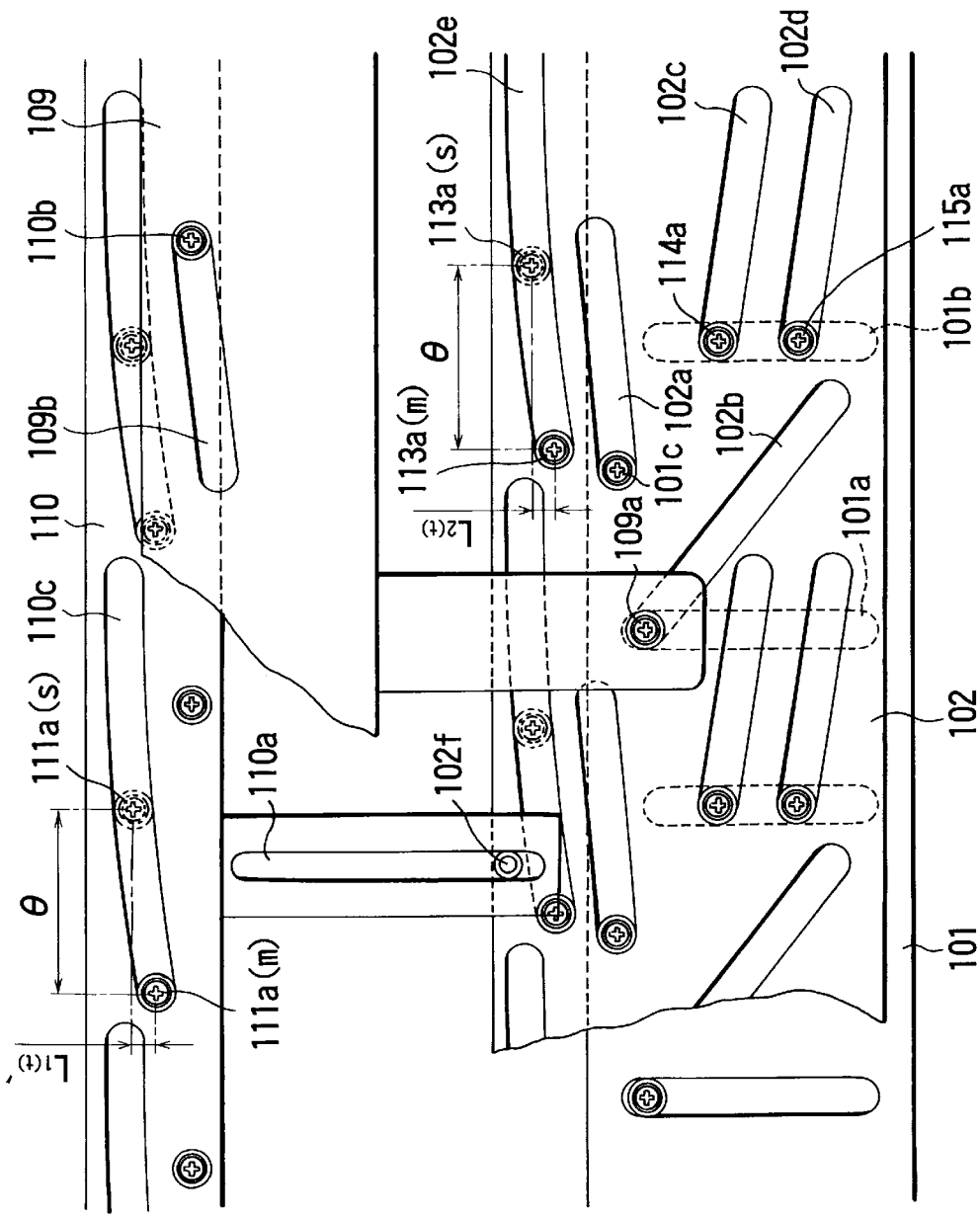
FIG. 12 is a development view showing an operating state of the lens barrel according to the third embodiment in a telephoto position.

FIGS. 9 and 10 are sectional views showing an interchangeable zoom lens barrel which is adapted for a single-lens reflex camera and is arranged according to the invention as a third embodiment thereof. FIGS. 11 and 12 are development views showing a driving mechanism of the zoom lens barrel. FIGS. 9 and 11 show the zoom lens barrel in a wide-angle state, while FIGS. 10 and 12 show the zoom lens barrel in a telephoto sate.

Referring to these figures, a fixed tube 101 is provided with three rectilinear motion groove parts 101a, three rectilinear motion groove parts 101b and three rollers 101c.

A zooming cam ring 102 is rotatably mounted on the outer circumference of the fixed tube 101. The zooming cam ring 102 is provided with three correction cams 102a which engage the rollers 101c of the fixed tube 101, three cams 102b for a first lens unit 103, three cams 102c for third and fifth lens units 105 and 107, three cams 102d for a fourth lens unit 106, three focus cams 102e for a second lens unit 104, and a projection 102f.

The first lens unit 103 is arranged to be used both for focusing and zooming. The second lens unit 104 is arranged to be used also both for focusing and zooming. The lens barrel includes also the third, fourth and fifth lens units 105, 106 and 107. The third and fifth lens units 105 and 107 are integrally held by holding frames 114 and 116.

A first rectilinear motion tube 108 and a second rectilinear motion tube 109 are united in one body. The first rectilinear motion tube 108 has a projection 108a arranged to engage an inner circumferential lead 118a which is formed at a zoom operation ring 118. The second rectilinear motion tube 109 has a zoom correcting cam 109b.

A first focusing cam ring 110 has a vertical groove part 110a arranged to engage the projection 102f of the zooming cam ring 102, a roller 110b arranged to engage the zoom correcting cam 109b formed in the second rectilinear motion tube 109, and a first lens unit focus cam 110c which is provided for driving a first lens unit holding frame 111.

The first lens unit holding frame 111 holds the first lens unit 103 and has a roller 111a which engages the first lens unit focus cam 110c of the first focusing cam ring 110.

A second lens unit holding frame 113 holds the second lens unit 104 and is rotatably fitted in the inner circumference of the zooming cam ring 102. The second lens unit holding frame 113 has a roller 113a which engages the second lens unit focus cam 102 formed in the zooming cam ring 102, and an engaging hole part 113b which engages a focus key 120 and a focus lever 121.

A third lens unit holding frame 114 holds the third lens unit 105 and is rotatably fitted in the inner circumference of the fixed tube 101. The third lens unit holding frame 114 has three rollers 114a which engage the rectilinear motion groove parts 101b formed in the fixed tube 101 and the cams 102c formed in the zooming cam ring 102.

A fourth lens unit holding frame 115 holds the fourth lens unit 106 and is rotatably fitted in the inner circumference of the third lens unit holding frame 114. The fourth lens unit holding frame 115 has three rollers 115a which engage the rectilinear motion groove parts 101b of the fixed tube 101 and the cams 102d formed in the zooming cam ring 102.

A fifth lens unit holding frame 116 holds the fifth lens unit 107 and is integrally attached to the third lens unit holding frame 114.

A known electromagnetic diaphragm 117 is secured to the third lens unit holding frame 116 and is electrically connected to a circuit board 125 through a flexible circuit board which is not shown.

The zoom operation ring 118 is mounted on a focus unit support tube 119 in such a way as to be rotatable only and is provided with the lead 118a on its inner circumference.

The focus unit support tube 119 supports a vibration wave motor 130 and a focusing operation ring 131. The vibration wave motor 130 is arranged in the same manner as in the case of the first embodiment. To be more specific, the vibration wave motor 130 is composed of a manual ring which engages the focusing operation ring 131 in such a way as to be rotatable together with the focusing operation ring 131, a stator which brings about vibration, a rotor which is pressed into contact with the stator, a plurality of rollers which are in contact with the rotor and the manual ring, and an output ring 130a which is arranged to rotatably hold these rollers.

The focus key 120 (serving as a body part of a rotary driving member) has its base end part secured to the output ring 130a with a screw and extends forward in the optical axis direction. The fore end part of the focus key 120 is thus inserted into an engaging hole part 113b which is formed in the first lens unit holding frame 113.

The focus lever 121 (serving as a movable part of the rotary driving member) has its base end part secured to the first lens unit holding frame 111 and extends rearward in the optical axis direction. The rear end part of the focus lever 121 is thus inserted into the engaging hole part 113b of the second lens unit holding frame 113 in such a way as to overlap the focus key 120.

A shell ring 122 is arranged to support the fixed tube 101, the focus unit support tube 119 and a mount 123.

The mount 123 is mechanically connected to a camera body which is not shown. Electrical contacts 126 are mounted on the mount 123 for communication between a back cover 124 and the camera body.

A circuit board 125 is electrically connected to the electromagnetic diaphragm 117, the vibration wave motor 130 and the electrical contacts 126 through a flexible circuit board which is not shown. A microcomputer which is not shown is mounted on the circuit board 125 and is arranged to control these parts.

With the lens barrel configured as described above, the zooming action and the focusing action are next described as follows. When the zoom operation ring 118 is turned for zooming, the inner circumferential lead 118a rotates. However, since the projection 109a formed on the second rectilinear motion tube 109 engages the rectilinear motion groove part 101a of the fixed tube 101 to restrict the first and second rectilinear motion tubes 108 and 109 from rotating, the engagement of the inner circumferential lead 118a with the projection 108a of the first rectilinear motion tube 108 causes the rectilinear motion tubes 108 and 109 to move straight in the optical axis direction.

The straight motion of the second rectilinear motion tube 109 causes the zooming cam ring 102 to rotate to a degree corresponding to the straight motion of the second rectilinear motion tube 109 through the engagement of the projection 109a with the cam 102b. At the same time, the zooming cam ring 102 is caused to move straight in the optical axis direction by the engagement of the roller 101c of the fixed tube 101 with the correction cam 102a.

With the zooming cam ring 102 thus caused to rotate, the engagement of the projection 102f of the zooming cam ring 102 with the vertical groove part 110a of the first focus cam ring 110 causes the first focus cam ring 110 to rotate integrally with the zooming cam ring 102 to the same degree. Then, the first focus cam ring 110 which is rotating is caused by the engagement of the roller 110b with the zoom correcting cam 109b of the second rectilinear motion tube 109 to move straight in the optical axis direction.

During zooming, since the first lens unit holding frame 111 is restrained from rotating as the focus lever 121 which is fixed to the first lens unit holding frame 111 engages the output ring 130a through the engaging hole part 113b of the first lens unit holding frame 113 and the focus key 120, the engagement of the roller 111a with the first lens unit focus cam 110c causes the first lens unit holding frame 111 to move straight in the optical axis direction relative to the first focusing cam ring 110 to an extent as much as the degree to which the first focusing cam ring 110 has rotated. Further, as the roller 111a of the first lens unit holding frame 111 moves along the first lens unit focus cam 110c, the range of use of the first lens unit focus cam 110c for focusing is varied.

Also, during zooming, the second lens unit holding frame 113 engages the output ring 130a through the focus key 120 and is thus restrained from rotating. Therefore, the engagement of the roller 113a with the second lens unit focus cam 102e of the zooming cam ring 102 causes the second lens unit holding frame 113 to move straight in the optical axis direction relative the zooming cam ring 102 to an extent as much as a degree to which the zooming cam ring 102 has rotated. Further, as the roller 113a moves along the second lens unit focus cam 102e, the range of use of the second lens unit focus cam 102e for focusing is varied.

Further, when the zooming cam ring 102 is rotated, since the third lens unit holding frame 114, the fifth lens unit holding frame 116 and the fourth lens unit holding frame 115 are restrained from rotating by the engagement of the rollers 114a and 115a with the rectilinear motion groove part 101b of the fixed tube 101, the engagement of the rollers 114a and 115a with the cams 102c and 102d causes the lens unit holding frames 114, 116 and 115 to move straight together in the optical axis direction.

On the other hand, when the output ring 130a is rotated for focusing either by actuating the vibration wave motor 130 or by operating the focusing operation ring 131 to rotate, the rotating force of the output ring 130a is transmitted to the second lens unit holding frame 113 through the focus key 120 and the engaging hole part 113b and also to the first lens unit holding frame 111 through the engaging hole part 113b and the focus lever 121. As a result, the holding frames 111 and 113 are driven to rotate.

The lens barrel is thus arranged to impart a rotating force to the first and second lens units 103 and 104 by means of the focus key 120 and the focus lever 121 which receive the rotation of the vibration wave motor 130 or that of the focusing operation ring 131. By virtue of this arrangement, the driving mechanism of the lens barrel can be simplified and the positions of the lens units 103 and 104 can be accurately controlled.

First, when the first lens unit holding frame 111 rotates, the roller 111a moves along the first lens unit focus cam 110c of the first focusing cam ring 110. Then, the engagement of the roller 111a with the cam 110c causes the first lens unit holding frame 111 to move straight in the optical axis direction.

In focusing in a wide-angle position, the roller 111a can turn, as shown in FIG. 11, from an infinity distance position 111a(m) to a nearest distance position 111a(s) as much as a rotation angle θ. Here, for example, when the roller 31a turns to the extent of the rotation angle θ, the roller 111a, i.e., the first lens unit holding frame 111, moves straight in the optical axis direction to an extent of a distance L1(w)'.

In focusing in a telephoto position, the roller 111a can turn, as shown in FIG. 12, from an infinity distance position 111a(m) to a nearest distance position 111a(s) as much as a rotation angle θ. Here, for example, when the roller 111a turns to the extent of the rotation angle θ, the roller 111a, i.e., the first lens unit holding frame 111, moves straight in the optical axis direction to an extent of a distance L1(t)'.

As apparent from FIGS. 11 and 12, the straight moving amount of the first lens unit holding frame 111 obtained by driving the roller 111a to the same rotation angle degree θ varies according to whether the lens barrel is in the wide-angle state or in the telephoto state. This is because, as mentioned in the description of the zooming action, the range of use of the first lens unit focus cam 110c varies with the position of zooming.

Further, when the second lens unit holding frame 113 rotates, on the other hand, the roller 113a moves along the second lens unit focus cam 102e of the zooming cam ring 102. Then, the engagement of the roller 113a with the focus cam 102e causes the second lens unit holding frame 113 to move straight in the optical axis direction. In focusing in a wide-angle state, the roller 113a can turn, as shown in FIG. 11, from an infinity distance position 113a(m) to a nearest distance position 113a(s) as much as a rotation angle θ. Here, for example, when the roller 113a turns to the extent of the rotation angle θ, the roller 113a, i.e., the second lens unit holding frame 113, moves straight in the optical axis direction to an extent of a distance L2(w)'.

In focusing in a telephoto state, the roller 113a can turn, as shown in FIG. 12, from an infinity distance position 113a(m) to a nearest distance position 113a(s) as much as a rotation angle θ. Here, for example, when the roller 113a turns to the extent of the rotation angle θ, the roller 113a, i.e., the first lens unit holding frame 113, moves straight in the optical axis direction to an extent of a distance L2(t)'.

The straight moving amount of the second lens unit holding frame 111 obtained by driving the roller 113a to the same rotation angle degree θ varies according to whether the lens barrel is in the wide-angle state or in the telephoto state, because, as mentioned in the foregoing, the range of use of the second lens unit focus cam 102e varies according to the position of zooming.

As described above, the arrangement for varying the straight moving amounts of the two lens units 103 and 104 according to the position of zooming enables the lens barrel to excel in optical performance, having a less amount of aberration fluctuations and yet allowing a reduction in the nearest focusable distance.

In each of the embodiments described above, the number of lens units to be driven in focusing is two. However, the number of lens units to be driven in focusing may be increased, for example, by arranging the lens barrel to have some additional focusing cam ring.

In the case of each of the embodiments described above, the invention is applied to an interchangeable lens adapted for a single-lens reflex camera. However, the invention is applicable also to other optical apparatuses such as a video camera, a lens-shutter type camera, etc.

We claim:

1. A lens barrel comprising:
    a first lens unit;
    a plurality of second lens units, located behind said first lens unit;
    a plurality of cams which are arranged to rotate around an optical axis during a focusing action to cause said plurality of second lens units to move in the optical axis direction, at least one of said plurality of cams being a range varying cam which varies a range of use in an associated lens unit according to a variation of magnification; and
    a rotary driving member arranged to rotate around the optical axis,
    wherein said plurality of second lens units are interlinked with said rotary driving member in such a way as to be movable in the optical axis direction.

2. A lens barrel according to claim 1, wherein said rotary driving member is provided with a groove part formed to extend in the optical axis direction, and wherein each of said plurality of lens units is provided with an engaging part which is inserted into said groove part in such a way as to be movable in the optical axis direction and which engages said groove part in the direction of rotation of said rotary driving member.

3. A lens barrel according to claim 1, wherein a specific lens unit among said plurality of lens units is directly interlinked with said rotary driving member, and other lens units are interlinked with said specific lens unit in such a way as to be rotatable integrally with said specific lens unit.

4. A lens barrel according to claim 1, wherein said rotary driving member is composed of a body part arranged to rotate at a predetermined position of the optical axis direction and a movable part arranged to be movable relative to said body part in the optical axis direction, and wherein a specific lens unit among said plurality of lens units is integrally attached to said movable part, and each of other lens units is provided with an engaging part which is held by said body part and said movable part to be movable in the optical axis direction and which engages said body part and said movable part in the direction of rotation of said rotary driving member.

5. A lens barrel according to claim 1, further comprising a magnification varying cam ring arranged to be driven during a magnification varying action to cause a magnification varying lens unit to be moved in the optical axis direction along a magnification varying cam, and
    wherein said range varying cam is formed in said magnification varying cam ring.

6. A lens barrel according to claim 1, wherein cams other than said range varying cam among said plurality of cams are formed either in a body of said lens barrel or in a fixed tube fixed to the body of said lens barrel.

7. A lens barrel according to claim 6, wherein lens units which engage the body of said lens barrel or said fixed tube include a lens unit for correcting aberrations of an optical system.

8. A lens barrel according to claim 1, wherein said plurality of lens units are disposed in rear of a lens unit which is disposed at a frontmost position of the optical axis direction.

9. A lens barrel comprising:

a plurality of lens units;

a plurality of cams arranged to respectively cause said plurality of lens units to move in an optical axis direction during a focusing action, each of said plurality of cams being a range varying cam which varies range of use in an associated lens unit according to variation of magnification;

a magnification varying cam ring arranged to be driven during a magnification varying action to cause a magnification varying lens unit to move in the optical axis direction by a magnification varying cam; and a plurality of focusing cam rings each of which is provided with said range varying cam, said plurality of focusing cam rings being driven in association with said magnification varying cam ring.

10. A lens barrel comprising:

a plurality of lens units;

a plurality of cams arranged to cause said plurality of lens units to move in an optical axis direction during a focusing action, each of said plurality of cams being a range varying cam which varies range of use in an associated lens unit vary according to variation of magnification;

a magnification varying cam ring arranged to be driven during a magnification varying action to cause a magnification varying lens unit to move in the optical axis direction; and a focusing cam ring arranged to be driven in association with said magnification varying cam ring, wherein said range varying cam is provided in each of said magnification varying cam ring and said focusing cam ring.

11. A lens barrel according to claim 10, wherein each of said plurality of lens units is a lens unit used both for the magnification varying action and the focusing action.

12. An optical apparatus having a lens barrel according to claim 1.

13. An optical apparatus having a lens barrel according to claim 2.

14. An optical apparatus having a lens barrel according to claim 3.

15. An optical apparatus having a lens barrel according to claim 4.

16. An optical apparatus having a lens barrel according to claim 5.

17. An optical apparatus having a lens barrel according to claim 6.

18. An optical apparatus having a lens barrel according to claim 7.

19. An optical apparatus having a lens barrel according to claim 8.

20. An optical apparatus having a lens barrel according to claim 9.

21. An optical apparatus having a lens barrel according to claim 10.

22. An optical apparatus having a lens barrel according to claim 11.

* * * * *